United States Patent
Kawazu et al.

(10) Patent No.: US 6,869,667 B2
(45) Date of Patent: Mar. 22, 2005

(54) WHITE LAMINATE POLYESTER FILM AND RECEIVING SHEET FOR THERMAL TRANSFER RECORDING USING IT

(75) Inventors: Yukio Kawazu, Ritto (JP); Hisashi Ohwatari, Anpanchi-gun (JP); Motoyuki Suzuki, Otsu (JP); Kozo Takahashi, Otsu (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 10/312,683

(22) PCT Filed: Apr. 16, 2002

(86) PCT No.: PCT/JP02/03767

§ 371 (c)(1),
(2), (4) Date: Mar. 10, 2003

(87) PCT Pub. No.: WO02/085622

PCT Pub. Date: Oct. 31, 2002

(65) Prior Publication Data

US 2004/0091708 A1 May 13, 2004

(30) Foreign Application Priority Data

Apr. 19, 2001 (JP) ........................................ 2001-120701

(51) Int. Cl.[7] .......................... B32B 27/08; B32B 27/18; B32B 27/20; B32B 27/36
(52) U.S. Cl. ...................... 428/212; 428/195; 428/213; 428/215; 428/339; 428/480; 428/304.4; 428/315.5; 428/317.9; 428/319.3
(58) Field of Search .................................. 428/195, 212, 428/213, 215, 332, 339, 480, 304.4, 315.5, 317.9, 319.3

(56) References Cited

U.S. PATENT DOCUMENTS

| | | | | |
|---|---|---|---|---|
| 5,084,334 A | * | 1/1992 | Hamano et al. | 428/304.4 |
| 5,422,175 A | * | 6/1995 | Ito et al. | 428/304.4 |
| 5,672,409 A | * | 9/1997 | Miyakawa et al. | 428/141 |
| 5,698,489 A | * | 12/1997 | Shirai et al. | 503/227 |
| 5,843,578 A | * | 12/1998 | Sasaki et al. | 428/483 |
| 5,935,904 A | * | 8/1999 | Shirai et al. | 503/227 |
| 6,004,664 A | * | 12/1999 | Sasaki et al. | 428/314.2 |
| 6,096,684 A | * | 8/2000 | Sasaki et al. | 503/227 |
| 6,143,408 A | * | 11/2000 | Fujita | 428/355 R |
| 6,187,523 B1 | | 2/2001 | Aylward et al. | |
| 6,287,680 B1 | * | 9/2001 | Sasaki et al. | 428/317.9 |
| 6,383,983 B1 | * | 5/2002 | Sasaki et al. | 503/227 |
| 2001/0036545 A1 | * | 11/2001 | Nishi et al. | 428/315.7 |
| 2003/0228430 A1 | * | 12/2003 | Tanaka et al. | 428/32.39 |

FOREIGN PATENT DOCUMENTS

| | | |
|---|---|---|
| EP | 0 582 750 A1 | 2/1994 |
| JP | 3-182349 | 8/1991 |
| JP | 3-206462 | 9/1991 |
| JP | 3-207694 | 9/1991 |
| JP | 3-261555 | 11/1991 |
| JP | 8-43994 | 2/1996 |
| JP | 8-122969 | 5/1996 |
| JP | 09-277479 | * 10/1997 |

* cited by examiner

Primary Examiner—Vivian Chen
(74) Attorney, Agent, or Firm—Piper Rudnick LLP

(57) ABSTRACT

A white laminated polyester film includes a white polyester layer (B) containing fine voids, and white polyester layers (A) containing inorganic fine particles and laminated on both surfaces of the white polyester (B). The white laminated polyester film has a predetermined relationship between the elastic modulus in the longitudinal direction and transverse direction and the specific gravity, and thus has excellent whiteness, printability and crease resistance. A receiving sheet for thermal transfer recording using the white laminated polyester film as a substrate causes no trouble in paper feeding and a clear printed image during printing. The white laminated polyester film of the present invention has optimum characteristics as a receiving sheet substrate for thermal transfer recording.

22 Claims, No Drawings

WHITE LAMINATE POLYESTER FILM AND RECEIVING SHEET FOR THERMAL TRANSFER RECORDING USING IT

TECHNICAL FIELD

The present invention relates to a white laminated polyester film excellent in whiteness, print clearness and crease resistance, and further relates to a while laminated polyester film suitable as a receiving sheet substrate for thermal transfer recording.

BACKGROUND ART

In the hard copy technology, thermal transfer recording having the properties such as non-impact, ease of operation and maintenance, and the probabilities of cost reduction and miniaturization, etc. attracts attention as a recording method. In a thermal transfer recording system, in printing, a transfer sheet (ink ribbon) having an ink layer serving as a colorant-containing layer is superposed on a receiving sheet, and a colorant-containing component or a colorant is transferred as fine dots onto the receiving sheet by melting or sublimation under heating by a thermal head from the ink ribbon side.

As a substrate of the receiving sheet for such thermal transfer recording, a white polyester film comprising polyester containing inorganic fine particles of titanium oxide, calcium carbonate, barium sulfate, or the like, or a resin noncompatible with polyester is conventionally used.

In general, such a film comprises a receiving layer provided thereon for improving a printing function, and is used as the receiving sheet for thermal transfer recording. However, there is demand for a white polyester film having high whiteness, permitting improvements in the accuracy of recording and the clearness of a printed image, and providing a feel of high grade.

In order to comply with this demand, films containing plural types of the above-described inorganic fine particles, films containing both the inorganic fine particles and a noncompatible resin, etc. are proposed in, for example, Japanese Unexamined Patent Application Publication Nos. 4-153232, 6-322153, etc.

DISCLOSURE OF INVENTION

A white laminated polyester film of the present invention comprises a white polyester layer (B) containing fine voids, and white polyester layers (A) containing inorganic fine particles and laminated on both surfaces of the white polyester (B), wherein assuming that the elastic modulus of the film in the longitudinal and transverse directions are respectively E1 and E2 (N/mm$^2$), and the specific gravity of the film is ρ, the following equations are simultaneously satisfied.

$$0.9 \leq E2/E1 \leq 1.6 \tag{1}$$

$$4000 \leq (E1+E2)/\rho \leq 8000 \tag{2}$$

The laminated film is a white laminated polyester film excellent in whiteness, image clearness and crease resistance.

BEST MODE FOR CARRYING OUT THE INVENTION

In the present invention, polyester is a polymer obtained by condensation polymerization of a diol and a dicarboxylic acid. Typical examples of a dicarboxylic acid include terephthalic acid, isophthalic acid, phthalic acid, naphthalenedicarboxylic acid, adipic acid, sebatic acid, and the like. Typical examples of a diol include ethylene glycol, trimethylene glycol, tetramethylene glycol, cyclohexane dimethanol, and the like. Examples of polyester include polyethylene terephthalate, polyethylene-p-oxybenzoate, poly-1,4-cyclohexylenedimethylene terephthalate, polyethylene-2,6-naphthalenedicarboxylate (polyethylenenaphthalate), and the like. These polyesters may be either homopolyetsers or copolyesters. Examples of comonomers for copolyesters may be diol components such as diethylene glycol, neopentyl glycol, polyalkylene glycol, and the like; and dicarboxylic acid components such as adipic acid, sebatic acid, phthalic acid, isophthalic acid, 2,6-naphthalenedicarboxylic acid, 5-sodium sulfoisophthalate, and the like. Furthermore, the polyester may contain proper additives, for example, an ultraviolet absorber, an ultraviolet stabilizer, a heat resistant stabilizer, an anti-oxidation stabilizer, an organic lubricant, organic fine particles, a filler, a nucleating agent, a dye, a dispersant, a coupling agent, etc. within a range causing no deterioration in the effect of the present invention according to demand.

In the present invention, as a method of whitening a white polyester layer (A), inorganic fine particles must be added to the polyester from the viewpoint of surface glossiness, time-lapse stability and a film forming property. The inorganic fine particles used in the present invention may have a void forming ability or may not have a void forming ability. Examples of the inorganic fine particles include fine particles of calcium carbonate, magnesium carbonate, zinc carbonate, titanium oxide, zinc oxide, cerium oxide, magnesium oxide, barium sulfate, zinc sulfate, calcium phosphate, silica, alumina, mica, mica titanium, talc, clay, kaolin, lithium fluoride, calcium fluoride, and the like. These inorganic fine particles may be used independently or in a combination of at least two types. The inorganic fine particles may be either porous or hollow and porous, and may be further subjected to surface treatment for improving dispersibility in a resin within a range causing no deterioration in the effect of the present invention.

The inorganic fine particles used in the present invention preferably have an average particle diameter of 0.05 to 3 Am, more preferably 0.07 to 1 μm, in the polyester from the viewpoint of uniform dispersibility, and surface glossiness and smoothness of the film. The amount of the inorganic fine particles added is preferably 1 to 30% by weight, more preferably 2 to 25% by weight, and most preferably 3 to 20% by weight, from the viewpoint of whiteness and a masking property of the film.

White polyester layer (B) or layers (B) used in the present invention must be a layer or layers containing fine voids. Namely, when the layer contains fine voids, a heat insulating effect on heating by a thermal head can be obtained during thermal transfer recording, thereby permitting efficient heat transmission to a print portion. Furthermore, the polyester layer (B) has a cushion property to increase adhesion between the thermal head and a printing surface, thereby improving the uniformity and efficiency of heat transmission to the print portion.

Preferred methods of forming fine voids include the following.

(1) A method of adding a foaming agent, and forming voids by heating at the time of extrusion or film forming, or by chemical decomposition to form voids.

(2) A method of adding a gas or a vaporizable material during extrusion.

(3) A method of adding a thermoplastic resin (non-compatible resin) non-compatible with polyester, and uniaxially or biaxially stretching the polyester to form fine voids.

(4) A method of adding a large amount of inorganic fine particles having a void forming ability instead of the non-compatible resin.

Of these methods, the method (3) using a non-compatible resin is particularly preferred from the comprehensive viewpoint of a film forming property, ease of control of the amount of the voids contained in the film, ease of the formation of uniform fine voids, and light weight.

As the non-compatible resin, thermoplastic resins other than polyester, which exhibit non-compatibility with polyester, are preferred, and resins which disperse in a particulate form in polyester and which have the great effect of forming voids in the film during stretching are preferred. More specifically, in a system in which polyester and the non-compatible resin are melted, a glass transition temperature (abbreviated to "Tg" hereinafter) corresponding to the non-compatible resin other than Tg corresponding to the polyester is preferably observed in measurement by a known method, for example, using a differential scanning calorimeter (DSC).

The melting point of the non-compatible resin is preferably lower than the melting point of polyester, and higher than the heat-setting temperature (heat treatment temperature) of the film during film forming. From this viewpoint, polyolefin resins such as polyethylene, polypropylene, polybutene, polymethylpentene, and the like, polystyrene resins, polyacrylate resins, polycarbonate resins, polyacrylonitrile resins, polyphenylenesulfide resins, fluorocarbon resins, and the like are preferably used as the non-compatible resin. These resins may be either homopolymers or copolymers, and at least two non-compatible resins may be combined. Of these resins, polyolefin resins having low critical surface tension, such as polypropylene, polymethylpentene, and the like are preferred, and polymethylpentene is most preferably used.

In the white laminated polyester film of the present invention, assuming that the elastic modulus of the film in the longitudinal and transverse directions are respectively E1 and E2 (N/mm$^2$), and the specific gravity of the film is ρ, the following equations are simultaneously satisfied.

$$0.9 \leq E2/E1 \leq 1.6 \quad (1)$$

$$4000 \leq (E1+E2)/\rho \leq 8000 \quad (2)$$

E2/E1 is 0.9 to 1.6, preferably 1.0 to 1.5, and more preferably 1.0 to 1.4. On the other hand, (E1+E2)/ρ is 4000 to 8000, preferably 4500 to 6500, and more preferably 5000 to 7000.

In the present invention, the values of both E2/E1 and (E1+E2)/ρ must be in the above ranges. If either of E2/E1 and (E1+E2)/ρ is out of the above range, a rigidity balance between the longitudinal and transverse directions of the film is lost, and flexibility of the whole film becomes improper to deteriorate the crease resistance. According to circumstances, a failure of deterioration in image clearness and printability easily occurs, and particularly when (E1+E2)/ρ is less than 4.000; the failure tends to become remarked.

When a film having E2/E1 and (E1+E2)/ρ either of which is out of the above range is used as a receiving sheet for thermal transfer recording, fine creases occur in the surfaces of the film due to the pressure of a feed roll and frictional resistance with a thermal head in a printing machine, thereby deteriorating the quality of a printed image due to the creases.

Namely, only when the values of both E2/E1 and (E1+E2)/ρ satisfy the above ranges, the white laminated polyester film having the excellent crease resistance can be obtained. Therefore, the; receiving sheet for thermal transfer recording, which comprises the film of the present invention, produces no crease, and is capable of producing a print with excellent image clearness.

The white laminated polyester film of the present invention preferably has a specific gravity ρ of 0.4 to 1.2, more preferably 0.5 to 1.1, and most preferably 0.6 to 1.0, from the viewpoint of the cushion property of the film.

In the white laminated film of the present invention which highly satisfy both the image clearness and crease resistance, the specific gravity ρ is preferably 0.9 or less, and an elongation Sm in the longitudinal direction and an elongation St in the transverse directions preferably satisfy the equations (3) and (4) below.

$$St \leq Sm \quad (3)$$

$$90\% \leq Sm \quad (4)$$

Sm is preferably 90% or more, more preferably 100% or more, most preferably 110% or more, and particularly preferably 120% or more. In order to set Sm in the above range, various methods of controlling the resin composition, film forming conditions, post-treatment, etc. can be used. From a study leading to achievement of the present invention, methods of controlling film forming conditions are exemplified, for example, stretching at a law value of stretching ratio by controlling a stretch ratio, particularly, multi-stage stretching, in the longitudinal direction, controlling the stretching temperature to a high temperature in a range causing no deterioration in thickness uniformity, controlling the temperature of a cooling roll to 30 to 60° C. after stretching, etc.

From the viewpoint of brightness of a printed image, the white laminated polyester film of the present invention preferably has a whiteness of 70% or more, more preferably 80% or more, and most preferably 90% or more.

From the viewpoint of clearness of a printed image, the white laminated polyester layer of the present invention preferably has a hue b value of 2 or less, more preferably 1 or less, and most preferably 0 or less.

From the viewpoint of smoothness of the film surface, the white laminated polyester film of the present invention preferably has a glossiness of 40% or more, more preferably 50% or more, and most preferably 55% or more.

The thickness of the white laminated polyester film of the present invention is not limited, but the thickness is preferably 10 to 500 μm, and more preferably 20 to 300 μm, because of excellent whiteness and handleability in practical use.

In the white laminated polyester film of the present invention, the thickness of the white polyester layer (A) is preferably 1 to 50 μm, and more preferably 2 to 30 μm, from the viewpoint of whiteness.

The white laminated polyester film of the present invention comprises the white polyester layer (B) containing fine voids, and the white polyester layer (A) containing inorganic fine particles and laminated on each of both surfaces of the polyester layer (B).

The types of the polyesters used for the white polyester layer (A) and the white polyester layer (B) may be the same or different. For example, the polyester used for the white polyester layer (A) may be polyethylene naphthalate, and the polyester used for the white polyester layer (B) may be polyethylene terephthalate. Also, the polyester used for the white polyester layer (A) may be copolyester, and the poly ester used far the white polyester layer (B) may be homopolyester.

In the present invention, as the method of laminating the white polyester layer (A) and the white polyester layer (B), a method of combining the layers by co-extrusion during melt film production, or a method of respectively depositing the layers and then laminating the layers can be used. However, from the viewpoint of productivity, the method of combining the layers by co-extrusion during melt film forming is preferred.

The white laminated film of the present invention preferably comprises a coated layer provided on at least one surface, and a surface resistivity measured from the coated layer side is $10^{12}$ $\Omega/\square$ or less and PH measured from the coated layer side is 4 to 10.

The surface resistivity measured from the coated layer side is preferably $10^{12}$ $\Omega/\square$ or less, more preferably $10^{11}$ $\Omega/\square$ or less, and most preferably $10^{10}$ $\Omega/\square$ or less. An antistatic property is more imparted as the surface resistivity decreases, and thus electrical charging can be suppressed in a processing step and in transfer in a printing machine, and in passage through the thermal head, thereby improving a paper feed property and exhibiting good image clearness and cease resistance. With a surface resistivity of $10^{12}$ $\Omega/\square$ or less, for example, when a receiving layer is provided on the surface of the film to form the receiving sheet, a product having good quality can be easily stably obtained without causing troubles such as adhesion between the receiving sheets due to static. electricity, a paper jam during printing, or the problem of adhesion of garbage and dust particles to the surface of the receiving sheet. Although a state without electrical resistance is most preferred, the surface resistivity is, in fact, generally $10^{-2}$ $\Omega/\square$ or more.

In the present invention, the surface of the coated layer preferably has a PH of 4 to 10, more preferably 4.5 to 9.5, most preferably 5 to 9. When the receiving layer is provided on the surface of the coated layer, with a surface PH of less than 4 or over 10, printability deteriorates in some cases. Particularly when the surface PH is less than 4 on the acid side, a phenomenon of discoloration occurs depending upon the dye used, thereby causing a practical problem of significantly deteriorating printability. Therefore, in some cases, it is difficult to form a clear image or a desired color.

When the coated layer is provided on the polyester layer (A), a layer comprising only an antistatic agent, or a layer further comprising a binder resin may be used. Particularly, when the receiving layer is provided on the film to form the thermal transfer recording receiving sheet, the layer which is comprising the binder resin together is more preferred because the effect of improving adhesion to the receiving layer can be expected.

Examples of the antistatic agent include ionic polymer compounds, surfactants, conductive inorganic fine particles, inorganic electrolytes, organic complex salts, and the like. Of these compounds, from the viewpoint of coating property, and miscibility with the binder resin and other compositions, ionic polymer compounds are preferably used. The term "ionic polymer compounds" is a general term for polymer compounds each having an ionic group in a main chain or side chain, or as a pendant of the main chain.

Examples of ionic groups of polymer compounds each having an ionic group include anionic groups of sulfonates, carboxylates, phosphates, alkylsulfonate salts, alkylphosphate salts, and the like; cationic groups of compounds each mainly composed of a tertiary ammonium salt such as an alkyltrimethylammonium salt, lauryltrimethylammoniuum chloride, an alkylpyrrolidium salt, or the like; nonionic groups of compounds each mainly composed of a polyether, a polyhydric alcohol, a polyoxyethylene alkylamine, a polyoxyethylene fatty acid ester, or the like; long chain fatty acid groups; ampholyte ions of compounds each having tertiary ammonium nitrogen and a carboxyl group or sulfone group; and the like.

Examples of a polymer compound having an ionic group in a main chain include polymer compounds each having a pyrrolidium ring, a piperidium ring, or the like in its main chain; and these polymer compounds each further containing, as a comonomer, a compound having an unsaturated bond.

Examples of a polymer compound having an ionic group in its side chain include polymer compounds each having a main chain comprising a homopolymer of acrylic acid, methacrylic acid, styrene, or the like and/or a copolymer with another component such as a saturated hydrocarbon such as ethylene, propylene, or the like, an unsaturated hydrocarbon such as acetylene, or the like, or alkyleneoxide, and a side chain having an ionic group of a phosphate salt, a sulfonate salt, a vinylsulfonate salt, a carboxylate salt, a tertiary ammonium salt, or the like.

In the present invention, as the antistatic agent, a polymer compound having an anionic group as an ionic group is particularly preferred from the viewpoint of miscibility and a coating ability. The above-described ionic polymer compounds may be used independently or in a combination of two or more compounds.

In the present invention, as the antistatic agent, a copolymer having a sulfonic group and/or a salt thereof is preferably used because it is excellent in heat resistance during a recycle, and particularly a styrenesulfonate metal salt is preferably used. The content of a styrenesulfonate metal salt is preferably 10 to 40% by weight. For a similar reason, polythiophene or a derivative thereof is also preferably used.

Examples of a copolymer having a sulfonic group and/or a salt thereof which is preferably used in the present invention include polyvinylsulfonic acid and/or salts thereof, polystyrenesulfonic acid and/or salts thereof. The copolymer may be formed by copolymerization with another comonomer to a degree causing no deterioration in characteristics, and a cross-linking function group may be added to the copolymer.

In the present invention, as the antistatic agent, a copolymer having a lithium sulfonate salt is particularly preferred from the viewpoint that both an antistatic property and surface PH are satisfied.

Preferred examples of the binder resin combined with the antistatic agent include resins which impart miscibility with the antistatic agent, a coating ability and adhesiveness to the receiving layer, for example, polyester resins, polyacrylate resins, polyurethane resins, polyvinylalcohol resins, polyvinylbutyral resins, and the like. Of these resins, particularly, polyester resins, polyacrylate resins, and polyurethane resins are preferably used. These resins may be used independently or in a mixture or a combination as a copolymer of two or more resins. Particularly, in the present invention, acrylic resins and polyester resins each having a glass transition temperature of 10 to 80° C. are preferred from the viewpoint of blocking resistance, an adhesive property, and miscibility with the antistatic agent.

In the present invention, as a combination of the antistatic agent and the binder resin, copolymerization with the antistatic agent or a mixture of both components is preferably used. A mixture of the antistatic agent and the binder resin is more preferred because it has good adhesiveness to the receiving layer and a wide selection range and application range. The ratio (weight ratio) of the antistatic agent to the binder resin is not limited within the range of the present invention. However, for example, the ratio (weight ratio) of the antistatic agent to the binder resin is preferably 5/95 to 95/5, and more preferably 10/90to 90/10. Particularly, when an ionic polymer compound is mixed in the binder resin, any mixing ratio may be used. However, in order to significantly exhibit the effect of the present invention, the solid content ratio by weight of the ionic polymer compound/the binder resin is preferably 40/60 to. 10/90, and more preferably 35/65 to 15/85. The mixing ratio depends upon the ionic polymer compound used, and a mixing ratio over the above range causes deterioration in the adhesive property, while a mixing ratio less than the range causes a difficulty in obtaining the antistatic property.

Furthermore, in the coated layer preferably coated on the white laminated polyester film of the present invention, a cross-linking agent may be added to the ionic polymer compound and the binder resin, and the cross-linking agent may be mixed at any desired ratio.

The layer preferably coated on the white laminated polyester film of the present invention may contain other additives, for example, a cross-linking agent, a surfactant, a antifoaming agent, a leveling agent, a heat-resistant stabilizer, an anti-oxidation stabilizer, an organic lubricating agent, organic or inorganic fine particles, a filler, a nucleating agent, a dye, and a dispersant, etc.

The method of forming the coated layer on the white laminated polyester film of the present invention preferably comprises coating a coating solution on the polyester layer (A) side of the white laminated polyester film, and then drying the coating.

Examples of the method of coating the coating solution for forming the coated layer include reverse (roll) coating, gravure coating, knife coating, air knife coating, roll coating, blade coating, bead coating, rotating screen coating, slot orifice coating, load coating, bar coating, die coating, spray coating, curtain coating, dicelot coating, champlex coating, brush coating, two-roll coating, metering blade-type size press coating, bill-blade coating, short dwell coating, gate roll coating, gravure reverse coating, extrusion coating, extrusion coating, and the like.

As the step of coating the coated layer, either a method (in-line coating) of coating in the step of depositing the white laminated polyester film, or a method (off-line coating) of coating on the film after film forming, and then drying the coating may be used. However, the in-line coating method is excellent from the viewpoint of uniform coating, thin film coating and economy. In order to improve the coating ability, the surface of the film before coating may be previously subjected:to pre-treatment such as corona discharge treatment, plasma treatment, or the like.

A liquid medium of the coating solution for forming the coated layer may an aqueous system, a solvent system, or a mixture system of water and a solvent, but an aqueous liquid medium or a mixed liquid medium mainly comprising water is preferably used for forming the coated layer by the in-line coating method from the viewpoint of handleability and safety such as explosion proof, or the like.

The coating thickness is preferably 0.005 to 10 $\mu$m, and: more preferably 0.01 to 5 $\mu$m. With the coated layer of less than 0.005 $\mu$m in thickness, the artistatic property easily deteriorates. On the other hand, with the coated layer of more than 10 $\mu$m in thickness, the coating ability of the coating solution for forming the coated layer deteriorates during coating, or the cost is undesirably increased to deteriorate economical efficiency.

The white laminated polyester film of the present invention can be preferably used for thermal transfer recording.

When the white laminated polyester film of the present invention is used as a receiving sheet substrate for thermal transfer recording, the polyester film may be used independently or in a combination with another material. Examples of another material include paper such as plain paper, wood free paper, medium quality paper, coated paper, art paper, cast-coated paper, resin-impregnated paper, glassine paper, laminated layer, and the like; synthetic paper; unwoven fabrics; other films; and the like.

Particularly, the white laminated film of the present invention is preferably bonded to paper. When the film is boned to paper, the crease resistance is strongly required from the viewpoint of handleability in the step of transferring in the copying machine and in the bonding step, and handleability as a product. From this viewpoint, the white laminated film defined in the present invention exhibit excellent characteristics.

Furthermore, in the present invention, the number of the creases produced in crease resistance evaluation I, which will be defined below, is preferably 3/cm or less, and more preferably 0. In the crease resistance evaluation I, wood free paper (Kokuyo Co., Ltd., KB-PF1039) having a thickness of 100 $\mu$m is uniformly boned to the side of the white laminated polyester film remote from the receiving layer formation side at a temperature of 110° C. by a laminator using a polyester resin (Toyobo. "Vylon" 500) as an adhesive to prepare a sheet for evaluating creasing. The thus-prepared sheet is cut into a sample having a length of 100 mm and a width of 25 mm, and the sample is folded at 180° around a circular iron core having a diameter of 15 mm as an axis with the film surface facing inward, to visually observe the occurrence of creases in the film surface. In this observation, the number of the creases produced is measured.

Next, the method of producing the white laminated polyester film of the present invention according to an embodiment will be described below, but the method is not limited to this embodiment.

In a composite film production apparatus comprising extruders (A) and (B), in order to form the white polyester layer (B), a mixture of dry polyester chips and dry noncompatible resin chips is supplied to the extruder (B) heated to 260 to 300° C., melted and then introduced into a T-die composite head.

On the other hand, in order to laminate the white polyester layer (A), a mixture of polyester chips and inorganic fine particles master chips is dried under vacuum. A fluorescent brightener may be added to the raw material according to demand.

Then, the dry raw material is supplied to the extruder (A) heated to 260 to 300° C., melted, and introduced into the T-die composite head Then, the polymer of the extruder (A) and the polymer of the extruder (B) are co-extruded into a sheet so that the polymer of the extruder (A) is laminated on the surface of the polymer of the extruder (B), to obtain a melt-laminated sheet.

The thus-obtained melt-laminated sheet is cooled by electrostatic adhesion to a cast drum at a surface temperature of 10 to 60° C. to prepare an unstretched laminated film. The unstretched laminated film is introduced into a roll group heated to 70 to 120° C., stretched to 2 to 5 times in the longitudinal direction, and then cooled to room-temperature.

Then, the laminated film stretched in the longitudinal direction is introduced into a tenter with both ends being gripped with grips, and then stretched to 2 to 5 times in the transverse direction in an atmosphere heated to 80 to 130° C.

The thus-obtained biaxially stretched laminated film is then heat-treated at 150 to 230° C. for 1 to 30 seconds in the tenter, uniformly slowly cooled to room temperature, and then taken up to obtain the white laminated polyester film of the present invention.

The method of setting the value of E2/E1 and (E1+E2)/ρ of the obtained white laminated polyester film in the ranges specified in the present invention is not limited. However, these values can be set by controlling a combination of the lamination ratio of the white polyester layer (A) and the white polyester layer (B), the size, amount and shape of the voids formed in the white polyester layer (B), stretching conditions in the longitudinal or transverse direction, the stretch ratio in the longitudinal/transverse direction, and the heat treatment temperature in the tenter.

When the white polyester layer (A) and the white polyester layer (B) have the same lamination ratio, these values can be achieved by changing the size and amount of the voids formed in the white polyester layer (B), or controlling the stretch ratios in the longitudinal direction and transverse direction.

The obtained white laminated polyester film of the present invention has excellent whiteness, printability and crease resistance.

The receiving sheet for thermal transfer recording, which comprises the substrate comprising the white laminated polyester film, causes no trouble in paper feeding and clearness in a printed image during printing. Therefore, the white laminated polyester film of the present invention is a film having optimum characteristics for a receiving sheet substrate for thermal transfer recording.

EXAMPLES

Although the present invention will be described below with reference to examples and comparative examples, the present invention is not limited to these examples.

Method of Measuring and Evaluating Properties

In the present invention, characteristic values were evaluated by the evaluation method below based on the evaluation criteria below.
(1) Presence of Voids A section of the film was cut out by a microtome, and observed with a scanning electron microscope S-2100A model (produced by Hitachi, Ltd.) with a magnification of ×500 to ×5000 to observe the presence of voids.
(2) Thickness of Film The total thickness T of the laminated film was measured by a dial gauge No. 2109-10 (gauge head diameter 10 mm, minimum scale 1 μm) produced by Mitsutoyo Co., Ltd.

The thickness t of the white polyester film layer (A) was measured from a SEM (magnification of ×2000) photograph of a section taken by the method (1).
(3) Specific Gravity ρ

The film was cut into a size of 50 mm×60 mm to obtain a sample, and the sample was measured with high-precision electron specific gravity meter D-120L (produced by Mirage Boeki Co., Ltd.) according to JIS K-7112 A method (underwater replacement). The measurement was conducted under conditions including a temperature of 23° C. and a relative humidity of 65%.

(4) Elastic Modulus and Tensile Elongation 10 strip samples of 1 cm wide and 18 cm long were prepared in each of the lonitudinal and transverse direction of the film. Measurement was carried out by using a Tensilone tensile tester AMF/RTA100 produced by Toyo Sokuteiki. In the measurement, each sample was gripped at a test length of 1.0 cm, and pulled at a load rate of 30 cm/min to record a load-elongation diagram. The elastic modulus in each of the longitudinal and transverse directions was calculated from the load-elongation diagram according to the equation below, and an average with n=10 was calculated.

$$E2, E2=\{(P_1-P_0)/(T\times W)\}\times(100/2.5)(N/mm^2)$$

E1: Elastic modulus in the longitudinal direction (N/mm$^2$)
E2: Elastic modulus in the transverse direction (N/mm$^2$)
$P_0$: Load with an elongation of 0.5% (N)
$P_1$: Load with an elongation of 3% (N)
T: Thickness of a sample (mm)
W: Width of a sample (mm)

The tensile elongation was determined by determining an elongation of the film from an elongation after fracture, and dividing the elongation by the initial length to obtain a fracture elongation. An average of n=10 was calculated to determine longitudinal elongation (Sm) and transverse elongation (St).
(5) Crease Resistance (Crease Resistance Evaluation I and Crease Resistance Evaluation II)

(5.1) Crease Resistance Evaluation I

Wood free paper (Kokuyo Co., Ltd., KB-PF1039) having a thickness of 100 μm was uniformly boned to the side of the white laminated polyester film remote from the receiving. layer formation side at a temperature of 110° C. by a laminator using a polyester resin (Toyobo "Vylon" 500) as an adhesive to prepare a sheet for evaluating creasing. The thus-prepared sheet was cut into a s:ample having a length of 100 mm and a width of 25 mm, and the sample was folded at 180° around an iron circular core: having a diameter of 15 mm as an axis with the film surface facing inward, to visually observe the occurrence of creases in the film surface. Evaluation was made based on the following criteria.

No crease ⊚
1 to 3 creases/cm ◯
4 to 9 creases/cm Δ
10 or more creases/cm ×
The samples evaluated as ⊚ and ◯ can be put into practical use.

(5.2) Crease Resistance Evaluation Test II

The samples evaluated as ◯ were further evaluated by the same method as described above except that an iron circular core having a diameter of 6 mm was used to determine the number of the creases produced (crease resistance evaluation II), In this evaluation, the number of the creases in each of the longitudinal direction and the widthwise direction was evaluated based on the following classification for overall evaluation.

0 to 4 creases/cm: A
5 to 8 creases/cm: B
9 or more creases/cm: C

The samples evaluated as "Δ" and "×" with the circular iron core having a diameter of 15 mm were evaluated as "D" and "E", respectively.

As a result of overall evaluation, the samples evaluated as "A" or "B" are excellent in practical use, and can be sufficiently used in a processing process in which speeding up and miniaturization are advanced.

(6) Whiteness

The three stimulus values, X value, Y value, and Z value, of a color were measured by using a spectral color-difference meter SE-2000 model (produced by Nippon Denshoku Kogyo Co., Ltd.) under optical conditions according to JIS Z-8722, and whiteness was calculated by the following equation.

Whiteness (%)=4×0.847×Z value−3×Y value (7) Hue b Value

The hue b value was determined by measurement with the apparatus under the optical conditions described above in (4) according to JIS Z-8730.

(8) Glossiness

Glossiness was measured with a digital bending gloss meter UGV-5B (produced by Suga Shikenki Co., Ltd.) from the white polyester layer (A) side according to JIS Z-8741. The measurement conditions included incidence angle=60°, and received light angle=60°.

(9) Printability

A coating solution for forming a receiving layer was coated on the white laminated polyester film of the present invention by using a gravure coater, and then dried at 120° C. for 1 minute to obtain a receiving sheet for thermal transfer recording, comprising the receiving: layer having a thickness of 0.1 μm.

[Coating solution for forming the receiving layer]

An urethane-modified polyethylene water dispersion (urethane modification rate=20% by weight, the water dispersion being obtained by emulsification by heating in an ammonia aqueous solution) was diluted with water so that the solid content was 3%.

Next, an 8-gradation test pattern was printed on the receiving layer formation surface of the sheet by using Profession Color Point 2 (produced by Seiko Instruments Inc.) as a color printer and CH705 (yellow, magenta, and cyan, produced by Seiko I Supply Co., Ltd.) specially used for an ink ribbon. Then, the printed test pattern was evaluated with respect to a print density, print dot shape and image clearness by the method described below to evaluate printability.

(9.1) Print Density

The print density was determined by measuring an optical density (reflection density) in a reflection system. Namely, the reflection density of a magenta portion by using-optical densitometer TR927 (produced by Macbeth Co., Ltd.), and the four-step evaluation below was performed by using an average of five measurements of reflection density. The samples evaluated as "⊚" or "○" were decided as good.

⊚: $0.13 \leq OD_{min}$, $0.85 \leq OD_{max}$

○: $0.1 \leq OD_{min} < 0.13$, $0.7 \leq OD_{max} \leq 0.85$

△: $0.07 \leq OD_{min} < 0.1$, $0.5 \leq OD_{max} \leq 0.7$

×: $OD_{min} < 0.7$, $OD_{max} < 0.5$ $OD_{min}$ and $OD_{max}$ represent the reflection densities of printed portions with the minimum gradation and the maximum gradation, respectively.

(9.2) Dot Shape

The dot shape was measured by observing each of yellow, magenta and cyan portions of the printed surface with a reflection optical microscope with a magnification of ×100 to ×300, and the four-step evaluation below was performed. The dot shapes evaluated as "⊚" or "○" were decided as good.

⊚: Very good clear circular dots of the three colors

○: Slightly cracked shape, but good shape

△: cracked or crushed shape, or small dot

×: Significantly cracked or crushed shape, or extremely small dot

(10) Surface Resistivity

A film sample was placed for 24 hours to control conditions at temperature 23° C. and a humidity of 65%, and then surface resistivity was measured under the same conditions by a digital ultrahigh resistance microammeter R8340 (produced by Advantest Corporation) with a voltage of 100 V applied. The measurement was conducted five times, and an average value was calculated.

(11) Surface PH

A film sample was placed in an ordinary state (23° C., relative humidity 65% for 24 hours, and then the surface PH of the sample surface was measured by using a PH meter "COMPACT PH METER twin PH" (type B212) produced by Horiba, Ltd. (when a coated layer was provided, the coating surface was measured). In order to carry out the measurement, ion exchange water was added dropwise to a sensor, and a sample cut into a predetermined size was set so as to cover two electrodes of the sensor. The measurement was performed five times, and an average of the five measurements was determined as a surface PH value.

Example 1

(Production of White Laminated Polyester Film)

In a composite film production apparatus comprising extruders (A) and (B), in order to form the white polyester layer (A), a raw material containing polyethylene terephthalate (abbreviated to "PET" hereinafter) chips, 6% by weight of anatase-type titanium oxide fine particles having an average particle diameter of 0.2 μm, and 0.1% by weight of fluorescent brightener "OB-1" (produced by Eastman Co., Ltd.) was dried at 180° C. for 3 hours, supplied to the extruder (A), melted at 285° C., and then introduced into a T-die composite head.

On the other hand, in order to form the white polyester layer (B), a material containing PET chips, 8% by weight of polymethylpentene (abbreviated to "PMP" hereinafter), and 1% by weight of polyethylene glycol (abbreviated to "PEG" hereinafter) having a molecular weight of 4000 as a dispersant was dried at 180° C. for 3 hours, supplied to the extruder (B), melted at 285° C., and then introduced into the T-die composite head. The white polyester layer (A) and the white polyester layer. (B) were extruded from the T-die composite head to laminate the three layers A/B/A, cooled and solidified by electrostatic adhesion to a cooling drum with a surface temperature kept at 25° C. to obtain an unstretched laminated film. The rotational speed of a screw of each of the extruders. (A) and (B) was controlled so that the lamination ratio of the white polyester layers (A) and (B) was A/B/A= 10/80/10.

Then, the unstretched laminated film was supplied to a roll group heated to 95° C., stretched to 3.2 times in the longitudinal direction, and cooled by a roll group of 25° C. to form a uniaxially stretched film. The uniaxially stretched film was introduced into a tenter with both ends being gripped by grips, pre-heated at 110° C. in a pre-heating zone, and then stretched to 3.4 times in the transverse direction in a stretching zone of 125° C. The film was further heat-treated at 210° C. in a heat treatment zone in the tenter, uniformly slowly cooled, and then taken up to obtain a white laminated polyester film having a thickness of 40 μm and a specific gravity of 0.82. As a result of SEM observation of a section of the white laminated polyester film, it was confirmed that the white polyester layer (B) contained fine voids.

(Preparation of Receiving Sheet)

The receiving layer forming coating solution below was coated on the surface layer of the resultant white laminated polyester film by a gravure coater so that the thickness after drying was 0.1 μm, and then dried at 120° C. for 2 minutes.
(Composition of the Receiving Layer Forming Coating Solution)

(a) Modified polyolefin: Urethane-modified polyethylene water dispersion (urethane modification rate 20% by weight, the water dispersion being obtained by emulsification by heating in an ammonia aqueous solution).

(b) Antistatic agent: Phosphate-type ionic polymer aqueous dispersion (obtained by emulsion polymerization of acid phosphoxy(polyoxyethylene glycol)monomethacrylate (number of the repeating units of oxyethylene glycol=5), which is previously neutralized with potassium hydroxide/butyl acrylatetacrylic acid at a ratio of 70/25/5 (% by weight).

The components (a) and (b) were mixed at a solid content ratio by weight of 50/50, and the resultant mixture was diluted to a solid content of 3% with water.

Next, wood free paper having a thickness of 100 μm was uniformly borided to the surface opposite to the receiving layer formation surface with a low-Tg polyester resin (Tg=4° C., softening point=114° C.) serving as an adhesive at a temperature of 110° C. to prepare a receiving sheet.
(Evaluation)

Table 2 shows the characteristics of the white laminated polyester film and the receiving sheet. The receiving sheet comprising the white laminated polyester film exhibits excellent printability and crease resistance.

Example 2

A white laminated polyester film having a thickness of 40 μm and a specific gravity of 0.80 was obtained by the same method as Example 1 except that 10% by weight of PMP was added, and the stretch ratios in the: longitudinal direction and transverse direction were 3.2 times and 3.6 times, respectively. Also, a receiving sheet was obtained by the same method as Example 1.

As a result of SEM observation of a section of the film, it was confirmed that the white polyester layer (B) contained fine voids.

The characteristics of the white laminated polyester film and the receiving sheet are as shown in Table 2. The receiving sheet comprising the white laminated polyester film exhibits excellent printability and crease resistance.

Example 3

A white laminated polyester film having a thickness of 40 μm and a specific gravity of 0.76 was obtained by the same method as Example 1 except that 12% by weight of PMP was added, and the stretch ratios in the longitudinal direction and transverse direction were 3.2 times and 3.8 times, respectively. Also, a receiving sheet was obtained by the same method as Example 1.

As a result of SEM observation of a section of the film, it was confirmed that the white polyester layer (B) contained fine voids.

The characteristics of the white laminated polyester film and the receiving sheet are as shown in Table 2. The receiving sheet comprising the white laminated polyester film exhibits excellent printability and crease resistance.

Example 4
(Production of White Laminated Polyester Film)

In a composite film forming apparatus comprising extruders (A) and (B), in order to form the white polyester layer (A), a raw material containing polyethylene terephthalate (abbreviated to "PET" hereinafter) chips, 6% by weight of anatase-type titanium oxide fine particles having an average particle diameter of 0.2 μm, and 0.1% by weight of fluorescent brightener "OB-1" (produced by Eastman Co., Ltd.) was dried at 180° C. for 3 hours, supplied to the extruder (A), melted at 285° C., and then introduced into a T-die composite head.

On the other hand, in order to form the white polyester layer (B), a material containing PET chips, 10% by weight of polymethylpentene (abbreviated to "PMP" hereinafter), and 1% by weight of polyethylene glycol (abbreviated to "PEG" hereinafter) having a molecular weight of 4000 as a dispersant was dried at 180° C. for 3 hours, supplied to the extruder (B), melted at 285° C., and then introduced into the T-die composite head. The white polyester layer (A) and the white polyester layer (B) were extruded from the T-die composite head to laminate the three layers A/B/A, cooled and solidified by electrostatic adhesion to a cooling drum with a surface temperature kept at 25° C. to obtain an unstretched laminated film.

Then, the unstretched laminated film was supplied to a roll group heated to 97° C., stretched to 1.1 times in the longitudinal direction and further stretched to 2.64 times (total stretch ratio, 2.9 times), and then cooled by a roll group of 35° C. to form a uniaxially stretched film. The uniaxially stretched film was treated by corona discharge in air, and the coating solution below was coated on the treated surface by a bar coating method using a metering bar. The uniaxially stretched film coated with the coating solution was then introduced into a tenter with both ends being gripped by grips, pre-heated at 110° C. in a pre-heating zone, and then stretched to 3.3 times in the transverse direction in a stretching zone of 125° C. The film was further heat-treated at 210° C. in a heat treatment zone in the tenter, uniformly slowly cooled, and then taken up to obtain a white laminated polyester film having a thickness of 35 μm, the coated layer having a thickness of 0.1 μm, and a specific gravity of 0.85. As a result of SEM observation of a section of the white laminated polyester film, it was confirmed that the white polyester layer (B) contained fine voids. Also, a receiving sheet was formed by the same method as Example 1.
(Coated layer Forming Coating Solution)

Antistatic agent: Polystyrene sulfonate lithium salt aqueous dispersion (molecular weight=about 70,000) Binder resin: Acrylic emulsion (acrylic component: copolymer of methyl methacrylate/ethyl acrylate/acrylic acid/N-methylolacrylamide=60/38/1/1 (% by weight), glass transition temperature 60° C.)

The antistatic agent and the binder resin were mixed at a solid content ratio by weight of 30/70, and the resultant mixture was diluted to a solid content of 4% with water.

Table 2 shows the characteristics of the white laminated polyester film and the receiving sheet. The receiving sheet comprising the white laminated polyester film exhibits excellent printability and crease resistance.

Example 5

A white laminated polyester film having a thickness of 35 μm and a specific gravity of 0.85 was obtained by the same method as Example 4 except that the coated layer forming coating solution was not coated. Also, a receiving sheet was obtained by the same method as Example 4.

As a result of SEM observation of a section of the film, it was confirmed that the white polyester layer (B) contained fine voids.

The characteristics of the white laminated polyester film and the receiving sheet are as shown in Table 2. The receiving sheet comprising the white laminated polyester film exhibits excellent printability and crease resistance.

Comparative Example 1

A white laminated polyester film having a thickness of 40 μm and a specific gravity of 0.81 was obtained by the same method as Example 1 except that the stretch ratio and the heat treatment temperature were as shown in Table 1. Also, a receiving sheet was obtained by the same method as Example 1.

As a result of SEM observation of a section of the film, it was confirmed that the white polyester layer (B) contained fine voids.

The characteristics of the white laminated polyester film and the receiving sheet are as shown in Table 2. The receiving sheet comprising the white laminated polyester film exhibits excellent printability, but it has poor crease resistance.

Comparative Example 2

A white laminated polyester film having a thickness of 40 μm and a specific gravity of 0.78 was obtained by the same method as Example 1 except that the stretch ratio and heat treatment temperature were as shown in Table 1. Also, a receiving sheet was obtained by the same method as Example 1.

As a result of SEM observation of a section of the film, it was confirmed that the white polyester layer (B) contained fine voids.

The characteristics of the white laminated polyester film and the receiving sheet are as shown in Table 2. The receiving sheet comprising the white laminated polyester film exhibits excellent printability, but it has poor crease resistance.

Comparative Example 3

A white laminated polyester film having a thickness of 40 μm and a specific gravity of 0.86 was obtained by the same method as Example 1 except that 6% by weight of PMP was added, 3% by weight of PEG was added, the stretch ratios in the longitudinal direction and transverse direction were 3.5 times and 4.0 times, respectively, and the heat treatment temperature was 230° C. Also, a receiving sheet was obtained by the same method as Example 1.

As a result of SEM observation of a section of the film, it was confirmed that the white polyester layer (B) contained fine voids.

The characteristics of the white laminated polyester film and the receiving sheet are as shown in Table 2. The receiving sheet comprising the white laminated polyester film exhibits excellent printability, but it has poor crease resistance.

Comparative Example 4

A white laminated polyester film having a thickness of 40 μm and a specific gravity of 0.90 was obtained by the same method as Example 1 except that 6% by weight of PMP was added, 3% by weight of PEG was added, the stretch ratios in the longitudinal direction and transverse direction were 3.0 times and 3.0 times, respectively, and the heat treatment temperature was 230° C. Also, a receiving: sheet was obtained by the same method as Example 1.

As a result of SEM observation of a section of the film, it was confirmed that the white polyester layer (B) contained fine voids.

The characteristics of the white laminated polyester film and the receiving sheet are as shown in Table 2. The receiving sheet exhibits excellent printability, but it has poor crease resistance.

TABLE 1

| | Adding amounts of inorganic particles and fluorescent brightener of white polyester layer (A) | Raw material composition of white polyester layer (B) | Stretch ratio (times) | | Heat treatment temperature (° C.) | Presence of voids |
|---|---|---|---|---|---|---|
| | | | Longitudinal direction | Transverse direction | | |
| Example 1 | TiO2 = 6, fluorescent brightener = 0.1 | PET/PMP/PEG = 91/8/1 | 3.2 | 3.4 | 210 | Presence |
| Example 2 | TiO2 = 6, fluorescent brightener = 0.1 | PET/PMP/PEG = 89/10/1 | 3.2 | 3.6 | 210 | Presence |
| Example 3 | TiO2 = 6, fluorescent brightener = 0.1 | PET/PMP/PEG = 87/12/1 | 3.2 | 3.8 | 210 | Presence |
| Example 4 | TiO2 = 6, fluorescent brightener = 0.1 | PET/PMP/PEG = 89/10/1 | 2.9 | 3.3 | 210 | Presence |
| Example 5 | TiO2 = 6, fluorescent brightener = 0.1 | PET/PMP/PEG = 89/10/1 | 2.9 | 3.3 | 210 | Presence |
| Comp. Example 1 | TiO2 = 6, fluorescent brightener = 0.1 | PET/PMP/PEG = 91/8/1 | 3.5 | 3.0 | 220 | Presence |
| Comp. Example 2 | TiO2 = 6, fluorescent brightener = 0.1 | PET/PMP/PEG = 91/8/1 | 3.0 | 3.9 | 220 | Presence |
| Comp. Example 3 | TiO2 = 6, fluorescent brightener = 0.1 | PET/PMP/PEG = 91/6/3 | 3.5 | 4.0 | 230 | Presence |
| Comp. Example 4 | TiO2 = 6, fluorescent brightener = 0.1 | PET/PMP/PEG = 91/6/3 | 3.0 | 3.0 | 230 | Presence |

PET: polyethylene terephthalate
PMP: polymethylpentene
PEG: polyethylene glycol
TiO2: titanium oxide

TABLE 2

|  | Example 1 | Example 2 | Example 3 | Example 4 | Example 5 | Comp. Example 1 | Comp. Example 2 | Comp. Example 3 | Comp. Example 4 |
|---|---|---|---|---|---|---|---|---|---|
| Properties of film |  |  |  |  |  |  |  |  |  |
| Total thickness ($\mu$m) | 40 | 40 | 40 | 35 | 35 | 40 | 40 | 40 | 40 |
| Surface layer thickness ($\mu$m) | 3.0 | 3.0 | 3.0 | 3.5 | 3.5 | 3.0 | 3.0 | 3.0 | 3.5 |
| Specific gravity $\rho$ | 0.82 | 0.80 | 0.76 | 0.85 | 0.85 | 0.81 | 0.78 | 0.86 | 0.90 |
| E1 (N/mm$^2$) | 2140 | 2300 | 2230 | 2100 | 2200 | 2250 | 2010 | 3340 | 1650 |
| E2 (N/mm$^2$) | 2440 | 2890 | 3030 | 2500 | 2550 | 1990 | 3440 | 3680 | 1710 |
| E2/E1 | 1.14 | 1.26 | 1.36 | 1.19 | 1.16 | 0.88 | 1.71 | 1.10 | 1.04 |
| (E1 + E2)/$\rho$ | 5585 | 6488 | 6920 | 5412 | 5588 | 5235 | 6987 | 8163 | 3733 |
| Whiteness (%) | 120 | 118 | 120 | 115 | 115 | 110 | 113 | 108 | 105 |
| Glossiness (%) | 72 | 70 | 74 | 70 | 70 | 70 | 71 | 70 | 68 |
| Hub b value | −4.9 | −5.3 | −4.5 | −4.5 | −4.5 | −4.7 | −5.0 | −4.1 | −4.6 |
| Elongation |  |  |  |  |  |  |  |  |  |
| Sm | 112 | 108 | 98 | 122 | 120 | 77 | 88 | 72 | 85 |
| St | 78 | 70 | 58 | 87 | 85 | 85 | 49 | 44 | 56 |
| Surface resistivity | 3 × 10$^{13}$ | 4 × 10$^{13}$ | 6 × 10$^{13}$ | 1 × 10$^{10}$ | 4 × 10$^{13}$ | 5 × 10$^{13}$ | 1 × 10$^{15}$ | 4 × 10$^{15}$ | 3 × 10$^{15}$ |
| PH | 6.8 | 6.8 | 6.8 | 5.6 | 6.8 | 6.8 | 6.8 | 6.8 | 6.8 |
| Properties of receiving sheet |  |  |  |  |  |  |  |  |  |
| Printability |  |  |  |  |  |  |  |  |  |
| Print density | ⊚ | ⊚ | ⊚ | ⊚ | ⊚ | ○ | ○ | ○ | Δ |
| Dot shape | ⊚ | ⊚ | ⊚ | ⊚ | ⊚ | ⊚ | ⊚ | ○ | Δ |
| Crease resistance I |  |  |  |  |  |  |  |  |  |
| MD | ⊚ | ⊚ | ⊚ | ⊚ | ⊚ | Δ | Δ | X | X |
| TD | ⊚ | ⊚ | ⊚ | ⊚ | ⊚ | X | X | X | X |
| Number of creases II |  |  |  |  |  |  |  |  |  |
| MD | 2 | 2 | 3 | 0 | 1 | — | — | — | — |
| TD | 2 | 4 | 5 | 0 | 1 | — | — | — | — |
| Results of overall evaluation of crease resistance | A | B | B | A | A | D | D | E | E |

MD: longitudinal direction,
TD: transverse direction

Table 2 indicates that the white laminated polyester films and the receiving sheets of Examples. 1 to 5 are excellent in printability and crease resistance.

On the other hand, the white laminated polyester films and the receiving sheets of Comparative Examples 1 to 4 have poor crease resistance.

INDUSTRIAL APPLICABILITY

The present invention can provide a film having excellent whiteness and glossiness, and thus a receiving sheet substrate for thermal transfer recording, which comprises the film, has excellent crease resistance and is capable of forming a clear printed image. Therefore, the receiving sheet substrate can be suitably used for melting-type and sublimation-type thermal transfer recording systems.

Also, the white laminated polyester film of the present invention can be suitably used as substrate sheets for paper substitutes such as cards, labels, seals, parcel delivery service check, image receiving sheets for video printers, image receiving sheets for bar-code printers, posters, maps, dust-free paper, display boards, white boards, photographic paper, etc.

What is claimed is:
1. A white laminated polyester film comprising a white polyester layer (B) containing fine voids, and white polyester layers (A) coataining inorganic tine particles and laminated on both surfaces of the white polyester (B), wherein assuming that elastic modulus of the film in the longitudinal and transverse directions are respectively E1 and E2 (N/mm$^2$), and the specific gravity of the film is $\rho$, the following equations are simultaneously satisfied,

$$0.9 \leq E2/E1 \leq 1.6 \tag{1}$$

$$4000 \leq (E1+E2)/\rho \leq 8000. \tag{2}$$

2. A white laminated polyester film according to claim 1, wherein the specific gravity $\rho$ of the laminated film is 0.9 or less.

3. A white laminates polyester film according to claim 1, wherein the longitudinal elongation Sm and the transverse direction elongation St satisfy the following equation (3), $$St \leq Sm. \tag{3}$$

4. A white laminated polyester film according to claim 1, wherein the longitudinal elongation Sm and the transverse direction elongation St satisfy the following equation (4), $$90\% \leq Sm. \tag{4}$$

5. A white laminated polyester film according to claim 1, wherein the thickness of the white polyester layer (A) containing inorganic fine particles is 1 to 50 $\mu$m.

6. A white laminated polyester film according to claim 1, wherein the total thickness of the laminated film is 10 to 500 $\mu$m.

7. A white laminated polyester film according to claim 1, wherein the whiteness is 70% or more, the hue b value is 2 or less, and the glossiness is 40% or more.

8. A white laminated polyester film according to claim 1, comprising a coated layer provided on at least one surface, wherein the surface resistivity measured from the coated layer side is $10^{12}$ Ω/☐ or less, and PH measured from the coated layer side is 4 to 10.

9. A white laminated polyester film according to claim 1, wherein the laminated polyester film is bonded to paper.

10. A white laminated polyester film according to claim 1, wherein the number of creases produced in crease resistance evaluation I is 3/cm or less.

11. A white laminated polyester film according to claim 1, wherein the laminated polyester film is used for thermal transfer recording.

12. A receiving sheet for thermal transfer recording, comprising a white a laminated polyester film according to claim 1.

13. A receiving sheet for thermal transfer recording, comprising a white a laminated polyester film according to claim 2.

14. A receiving sheet for thermal transfer recording, comprising a white a laminated polyester film according to claim 3.

15. A receiving sheet for thermal transfer recording, comprising a white a laminated polyester film according to claim 4.

16. A receiving sheet for thermal transfer recording, comprising a white a laminated polyester film according to claim 5.

17. A receiving sheet for thermal transfer recording, comprising a white a laminated polyester film according to claim 6.

18. A receiving sheet for thermal transfer recording, comprising a white a laminated polyester film according to claim 7.

19. A receiving sheet for thermal transfer recording, comprising a white a laminated polyester film according to claim 8.

20. A receiving sheet for thermal transfer recording, comprising a white a laminated polyester film according to claim 9.

21. A receiving sheet for thermal transfer recording, comprising a white a laminated polyester film according to claim 10.

22. A receiving sheet for thermal transfer recording, comprising a white a laminated polyester film according to claim 11.

* * * * *

UNITED STATES PATENT AND TRADEMARK OFFICE
CERTIFICATE OF CORRECTION

PATENT NO. : 6,869,667 B2
DATED : March 22, 2005
INVENTOR(S) : Kawazu et al.

It is certified that error appears in the above-identified patent and that said Letters Patent is hereby corrected as shown below:

Column 2,
Line 44, please change "Am" to -- $\mu$m --.

Column 10,
Line 7, please change "1.0 cm" to -- 10 cm --;
Line 50, please change "O" to -- ◎ --.

Column 11,
Line 51, please change "≤ 0.85" to -- <0.85 --;
Line 52, please change "≤ 0.7" to -- <0.7 --.

Column 17,
Table 2, at "surface resistivity" please change "$10^{13}$" to -- $10^{15}$ -- at Examples 1, 2, 3, 5, and Comp Example 1; and please change "$10^{15}$ to -- $10^{16}$ -- at Comp. Example 2.

Signed and Sealed this

Sixth Day of September, 2005

JON W. DUDAS
*Director of the United States Patent and Trademark Office*